United States Patent [19]

Dukshtau et al.

[11] 4,264,836

[45] Apr. 28, 1981

[54] LAMINATED ROTOR FOR A SYNCHRONOUS SALIENT-POLE ELECTRICAL MACHINE

[76] Inventors: Alexandr A. Dukshtau, ulitsa Basseinaya, 111, korpus 3, kv. 34; Alexandr N. Lurie, ulitsa Belgradskaya, 6, korpus 2, kv. 237; Jury S. Golubentsev, ulitsa Kubinskaya, 70, korpus 1, kv. 14; Felix M. Detinko, prospekt Morisa Toreza, 104, korpus 3, kv. 2; Grigory B. Pinsky, ulitsa Varshavskaya, 41, korpus 2, kv. 68, all of, Leningrad, U.S.S.R.

[21] Appl. No.: 46,447

[22] Filed: Jun. 7, 1979

[51] Int. Cl.³ .............................................. H02K 1/22
[52] U.S. Cl. .................................... 310/261; 310/216; 310/269; 310/51
[58] Field of Search .......... 310/51, 261, 269, 216–218, 310/162–165

[56]         References Cited
          U.S. PATENT DOCUMENTS

| | | | |
|---|---|---|---|
| 1,808,572 | 6/1931 | Reist | 310/269 X |
| 3,280,355 | 10/1966 | Ruelle et al. | 310/269 |
| 3,307,059 | 2/1967 | Kitano et al. | 310/216 |
| 3,488,754 | 1/1970 | Hohnstein | 310/269 X |

Primary Examiner—Mark O. Budd
Attorney, Agent, or Firm—Lackenbach, Lilling & Siegel

[57]             ABSTRACT

A rotor, for a synchronous salient-pole electrical machine, having a rim built up in annular layers consisting of segments provided with recesses forming slots on the rim circumference, in which like poles are mounted and which form a plurality of groups distributed in series over the rim circumference, the distances between the adjacent slots in all the groups being the same and different than equal distances between the adjacent slots of different groups. In some of the segments the adjacent recesses are spaced from each other by a distance equal to the distance between the slots within a group. In other segments, mounted in those layers of the rim wherein, between the places of location of the adjacent slots of different groups there are no joints between the segments, the adjacent recesses are arranged in the same manner except that two adjacent recesses in each of the segments are located at a distance equal to the distance between the adjacent slots of different groups and coincident, upon the installation, with the places of location of these slots.

1 Claim, 10 Drawing Figures

LAMINATED ROTOR FOR A SYNCHRONOUS SALIENT-POLE ELECTRICAL MACHINE

FIELD OF THE INVENTION

The present invention relates to alternating-current electrical machines and, more specifically, to rotors for synchronous salient-pole electrical machines.

The present invention can be used in large-sized low-speed synchronous salient-pole electrical machines and used to best advantage in powerful hydro-generators.

BACKGROUND OF THE INVENTION

In the production of windings of synchronous salient-pole electrical machine stators, especially those of hydrogenerator stators, it is customary to minimize the number of stator slots per pole per phase, therby reducing labour intensiveness and time consumption. With a small number of stator slots per pole per phase, however, the tooth harmonics in the emf curve of an electrical machine rise markedly, which results in increased energy losses, and, also, in an increased level of telephony disturbance, lying outside the limits allowed in international standards.

It is well known that in order to suppress the tooth harmonics, the poles should be distributed over the rotor rim circumference of a synchronous salient-pole electrical machine so that the distance never be the same between magnetic axes of the poles, i.e. between the lines of intersection of a cross-section plane of the rotor and longitudinal central planes, wherein magnetic fluxes generated by the poles are maximal, that is, the poles be in groups distributed in series over the rotor circumference and having an equal number of poles, whose magnetic axes within each group are spaced from each other by the same distances, equal to the distances between the magnetic axes of the poles of other groups and different from equal distances between the magnetic axes of the adjacent poles of different groups (cf., for instance, "Methods for improvement of the voltage curve and reducing the telephony disturbance ratio" by A. X. Dookshtau and G. B. Pinsky, "Electrotechnika", No. 3, 1978, pp.31–32).

Known in the art is a rotor for a synchronous salient-pole electrical machine, having a heavy rim with poles mounted thereon and evenly distributed over the circumference thereof, in which, in order to suppress the tooth harmonics, the shoes of different poles are shifted dissimilarly with respect to the cores, thereby providing a different shift of the magnetic axes of the poles with respect to symmetry axes of the cores, that is, the poles form the groups described above (cf., for instance, "Konstruktion Elektrisher Maschinen" by E. Wiedemann and W. Kellenberger, Springer-Verlag, Berlin (Heidelberg), New York, 1967, p.369, FIG. 365).

In this case, however, in order to ensure an adequate suppression of the tooth harmonics, it is necessary to have a great quantity of types of the poles of various configuration and also a great number of types of members for connection of coils and damping segments of the adjacent poles.

This complicates considerably the production of parts of the rotor of an electrical machine, as well as its assembly and repair.

There is known a rotor for a synchronous salient-pole electrical machine, having a heavy rim and poles attached by bolts thereto symmetrically with respect to their magnetic axes and unevenly distributed over the rim circumference, thus forming the groups described above, which ensures suppression of the tooth harmonics. Electrical machines provided with such rotors are installed, for example, in the Saratov's and Volkhov's hydroelectric power stations, in the Soviet Union.

In such machines, all the poles are made the same, and connecting members of two types only are required to assemble the rotor: to make connections in the intervals between adjacent poles within a group, and to make connections in the intervals between adjacent poles of different groups. Such a construction, however, can be used only with a rotor having a heavy rim, for example, all-cast or bent one, which enables the poles to be attached thereto by bolts.

The heavy-rim rotors, nevertheless, are of limited usefulness and can not be used in large-sized low-speed powerful electrical machines with the rotor of a large diameter, due to difficulties associated with the manufacturing of the rotor and its transportation. In such electrical machines rotors are used with a laminated rim having slots distributed over the circumference thereof, wherein the poles are mounted.

There is known a rotor for a synchronous salient-pole machine, having a rim built up in annular layers consisting of segments provided with recesses and mounted at a shift of the joints between the segments of each of the layers with respect to the joints between the segments of an adjacent layer so that the recesses in the segments of the adjacent layers are found to be opposite to each other, thus forming slots on the rim circumference, in which like poles are mounted, all the segments being shaped so that, in each of them, the adjacent recesses are spaced from each other by a distance equal to the rim circumference length divided by the number of the poles, so that the slots of the rim formed by the recesses, wherein the poles are mounted, are spaced from each other by the same distance equal to said distance between the adjacent recesses of the segments (cf., for instance, "Konstruktion Electrischer Maschinen" by E. Wiedemann, W. Kellenberger, Springer-Verlag Berlin (Heidelberg), New York, 1967, p.458 FIG. 429).

However, such a construction of the rotor fails to provide suppression of the tooth harmonics, since, in this case, the magnetic axes of the poles arranged on the rim circumference are found at the same distances from each other. This deteriorates the emf curve shape of the electrical machine which, as mentioned above, leads to increased energy losses and to an impermissible increase in the level of telephony disturbance.

To suppress the tooth harmonics, it could be possible to use dissimilar poles whose magnetic axes are shifted at different distances with respect to symmetry axes of the cores, for example, the poles whose shoes are dissimilarly shifted with respect to the cores as is done in electrical machines with a heavy-rim rotor. However, as mentioned above, the use of the dissimilar poles complicates considerably the manufacturing of the rotor parts as well as its assembly and repair.

SUMMARY OF THE INVENTION

It is an object of the present invention to provide a rotor for a synchronous salient-pole electrical machine with a rim built up in segments, which ensures an improved emf curve shape due to suppression of the tooth harmonics, thereby reducing energy losses and telephony disturbance level, all at rather minor complication of the production of rotor parts, its assembly and repair.

It is another object of the present invention to provide a rotor for a synchronous salient-pole electrical machine with a rim built up in segments, which ensures suppression of the tooth harmonics in the emf curve of the machine when mounting like poles on the rotor and using a minimal type variety of elements intended for connection of the coils and damping segments of the adjacent poles.

It is still another object of the present invention to provide a rotor for a synchronous salient-pole electrical machine, having a rim built up in segments, the segments of the rim being shaped and mounted so that to provide a distribution of like poles over the rim circumference permitting the poles to form groups arranged in series on the rim circumference and having the same number of poles whose magnetic axes are spaced by the same distances from each other within each of the groups, equal to the distances spacing magnetic axes of the poles from each other in other groups and different from equal distances between magnetic axes of adjacent poles of different groups.

With the above mentioned and other objects in view, there is provided a conventional rotor for a synchronous salient-pole electrical machine, having a rim built up in annular layers consisting of segments provided with recesses and mounted with a shift of the joints between the segments of each of the layers with respect to the joints between the segments of an adjacent layer so that the recesses in the segments of adjacent layers are found to be opposite to each other, thus forming slots on the rim circumference, in which alike poles are arranged. According to the invention, the slots of the rim are arranged so that they form a plurality of groups distributed in series over the rim circumference and having the same number of slots located within each of the groups at the same distances from each other, equal to the distances between the slots in other groups and different from equal distances between adjacent slots of different groups, thereby providing suppression of the tooth harmonics in the emf curve of the electrical machine. Some segments are shaped so that the adjacent recesses in each of them are spaced from each other by a distance equal to the distance between the adjacent slots within a group and arranged so that the recesses of each of them are found to be in the places of location of the slots of the same group. The remaining segments are shaped so that two adjacent recesses in each of them are spaced from each other by a distance equal to the distance between the adjacent slots of different groups, and the rest of the adjacent recesses are spaced from each other by a distance equal to the distance between the adjacent slots within a group. These segments are mounted in those layers of the rim, wherein, between the places of location of the adjacent slots of different groups, there are no joints between the segments, so that their recesses located at a distance equal to the distance between the adjacent slots of different groups are found to be in the places of location of adjacent slots of different groups.

Said shaping and arrangement of the segments of the rotor rim make possible a non-uniform distribution of the slots formed on the rim circumference by recesses of the segments, that corresponds to the distribution of magnetic axes of the rotor poles ensuring the suppression of the tooth harmonics. This enables the use of like poles and, therefore, to manage with members of two types only intended for the connection of the coils and damping segments of the adjacent poles. Some increase in the number of the types of the segments used to assemble the proposed laminated rotor rim, involved with such an embodiment of the rim, complicates slightly the production of parts of the rotor and its assembly, as compared with the complication in case the uniform distribution of the slots over the rim circumference using nonlike poles is to be obtained. This comes from the fact that, for electrical machines of up-to-date design, an increase in the number of types of the segments will be minor, as compared with the increase in types of the poles and interpolar connections if it is the case of an uniform distribution of the slots. Furthermore, an increase in type number of the segments used to assemble the rotor does not complicates its repair, for there is no need to disassemble the rim while repairing, whereas the great number of the types of the poles and interpolar connections used in the conventional rotors complicates considerably repair operations. Thus, the proposed rotor construction ensures an improvement of the emf curve of the electrical machine due to suppression of the tooth harmonics and subsequent decrease in energy losses and telephony disturbance, all at the expense of rather minor complication of the production of parts of the rotor, its assembly and repair.

BRIEF DESCRIPTION OF THE DRAWINGS

These and other objects and advantages of the present invention will be more apparent from the following description of the preferred embodiments taken in conjunction with the accompanying drawings, in which.

DETAILED DESCRIPTION OF THE INVENTION

Figure 1:
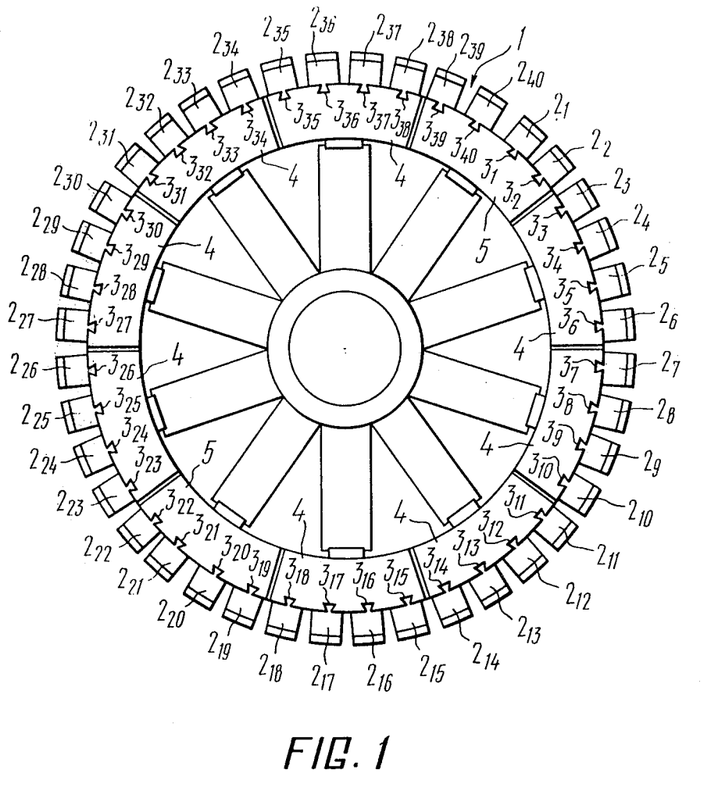
FIG. 1 is a view showing the distribution of the poles over the circumference of a laminated rim of a synchronous salient-pole electric machine rotor, according to the present invention, wherein the distances between the adjacent poles of different groups exceed the distances between the adjacent poles within a group.

Referring to FIG. 1, an end view of the rotor of a synchronous salient-pole electrical machine, is shown. The rim 1 has like poles $2_1$ through $2_{40}$ mounted arounds its periphery, each of them being symmetrical with respect to its magnetic axis. The poles $2_1$ through $2_{20}$ are arranged so that their magnetic axes are equispaced by a distance $\tau_1$, thus forming one grouup of poles. The poles $2_{21}$ through $2_{40}$ are also arranged so that their magnetic axes are equispaced by the same distance $\tau_1$, thus forming a second group of poles. The distance between the magnetic axis of the pole $2_1$ of the first group and the magnetic axis of the pole $2_{40}$ of the second group has a value $\tau_2$ exceeding the value $\tau_1$ of the distance between magnetic axes of the adjacent poles within a group. The distance between the magnetic axes of the other adjacent poles of different groups, namely the pole $2_{20}$ of the first group and the pole $2_{21}$ of the second group, is also equal to $\tau_2$. The poles $2_1$ through $2_{40}$ are mounted, respectively, in slots $3_1$ through $3_{40}$ whose distribution over the circumference of the rim 1 coincides with the distribution of the magnetic axes of the respective poles. As a result, the slots also form two groups, one comprising the slots $3_1$ through $3_{20}$ and the other the slots $3_{21}$ through $3_{40}$. The slots $3_1$ through $3_{20}$ of the first group as well as the slots $3_{21}$ through $3_{40}$ of the second group are spaced from each other by distances equal to $\tau_1$, whereas adjacent slots of different groups, namely the slots $3_{20}$ and $3_{21}$ and the slots $3_{40}$ and $3_1$ are spaced from each other by a distance equal to $\tau_2$.

The rim 1 of the rotor is built up in annular layers, each consisting of ten segments. Referring to the FIGS. 2, 3, 4, 5, and 6, there are shown, respectively, the segments 4, 5, 6, 7 and 8 of various types used to build up the rim 1 in segments having a length amounting to about four pole pitches. A shift of the joints between the segments of each of the layers with respect to the joints between the segments of an adjacent layer is about equal to one half the pole pitch within a group. By a pole pitch is meant the distance between the magnetic axes of the adjacent poles.

Figure 2:
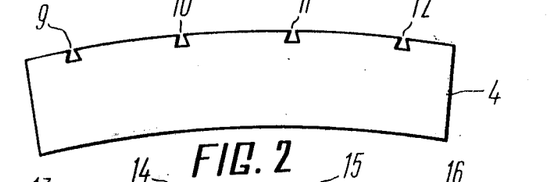
FIGS. 2, 3, 4, 5 and 6 show segments of various types used to build up a rotor rim, when distributing the poles over the rim circumference as shown in FIG. 1.
Figure 3:
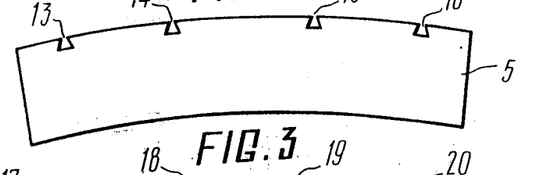
Figures 4, 5, 6:
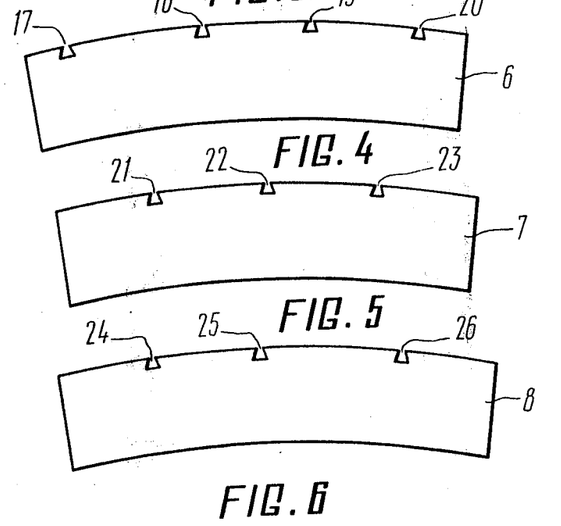

Referring now to FIG. 2, there is shown the segment 4 having four recesses 9, 10, 11 and 12 spaced from each other by distances equal to the pole pitch within a group, i.e. to $\tau_1$. The distances from the edges of the segment 4 to the nearest respective recesses 9 and 12 are somewhat less than one half the pole pitch within a group, i.e. somewhat less than $\tau_1/2$. The segment 5 shown in FIG. 3 and the segment 6 shown in FIG. 4 also have four recesses each, namely, recesses 13, 14, 15 and 16 on segment 5 and recesses 17, 18, 19 and 20 on segment 6. The distance between the middle recesses 14 (FIG. 3) and 15 of the segment 5 is equal to the distance between the magnetic axes of the adjacent poles of different groups, i.e. to $\tau_2$; the distance between each of the extreme recesses 13 and 16 of segment 5 and the closest to them middle recesses 14 and 15, respectively, is equal to $\tau_1$. The distance between one of the extreme recesses of the segment 6 (FIG. 4) and the recess closest to it, namely between the recesses 17 and 18, is equal to $\tau_2$; the distances between the remaining adjacent recesses of the segment 6, i.e. between the recesses 18 and 19 and between the recesses 19 and 20, are equal to $\tau_1$. The distances from the edges of the segments 5 (FIG. 3) and 6 (FIG. 4) to the nearest respective recesses 13 and 16 and 17 and 20, respectively, are somewhat less than $\tau_2$. The segment 7 shown in FIG. 5 and the segment 8 shown in FIG. 6 have three recesses each, namely recesses 21, 22 and 23 on segment 7 and recesses 24, 25 and 26 on segment 8. The recesses 21, 22 and 23 of the segment 7 are spaced from each other by distances equal to $\tau_1$.

The two adjacent recesses 24 and 25 of the segment 8 are spaced from each other by the distance $\tau_1$, the other two adjacent recesses 25 and 26 of this segment are spaced from each other by the distance $\tau_2$. The distances from the edges of each of the segments 7 (FIG. 5) and 8 (FIG. 6) to the nearest respective recesses 21 and 23 and 24 and 26, respectively, are the same and are somewhat less than the pole pitch within a group, i.e. somewhat less that $\tau_1$.

By reference to FIG. 1, it will be seen that the extreme layer of the rim 1 of the rotor consists of two sets of four segments 4 mounted in series and of two segments 5, one of which being mounted between one pair of the extreme segments of different groups facing each other and the other being mounted between the other pair of such segments.

Figure 7:
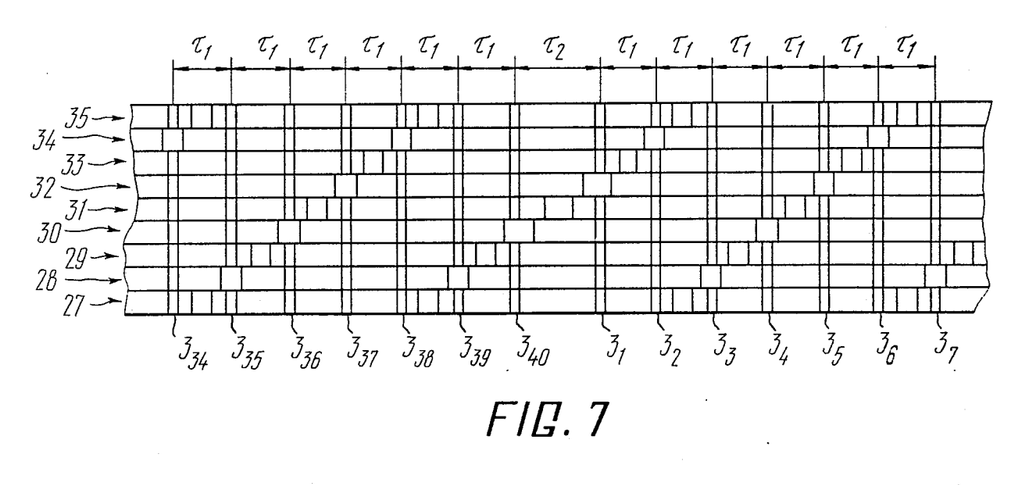
FIG. 7 illustrates the distribution of the slots over the rotor rim circumference, when the distribution of the poles over the rim circumference is as shown in FIG. 1.
Figure 8:
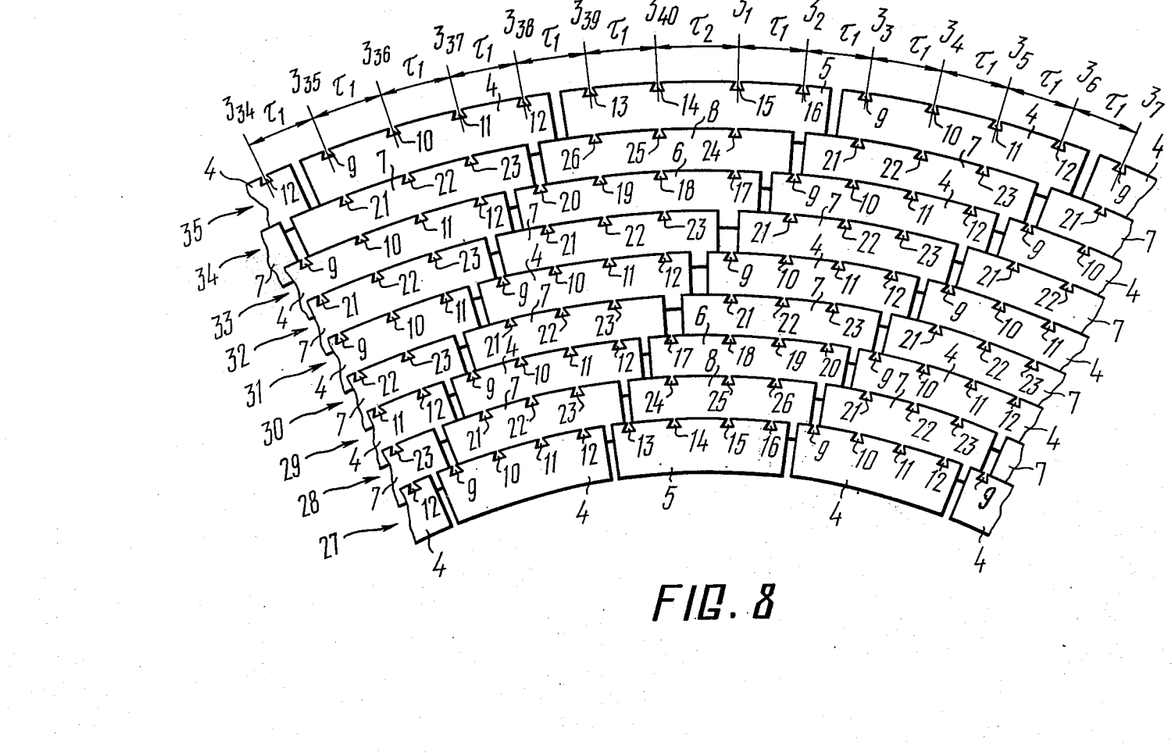
FIG. 8 is a view showing the building up of the rim with the segments shown in FIGS. 2 through 6.

Referring to FIGS. 7 and 8, there is shown, in more detail, a distribution of the segments in nine sequential layers 27, 28, 29, 30, 31, 32, 33, 34 and 35 of the rim 1 (FIG. 1) in the zone of installation of the poles $2_{34}$ through $2_{40}$ and $2_1$ through $2_7$. Referring to FIG. 7, there is shown the outer surface of the layers of the rim 1 (FIG. 1) in the zone of installation of the poles $2_{34}$ through $2_{40}$ and $2_1$ through $2_7$, which surface is conditionally rotated in the drawing plane. Referring to FIG. 8, there is shown an end view of the rim 1 (FIG. 1) in the zone of installation of the poles $2_{34}$ through $2_{40}$ and $2_1$ through $2_7$, the segments of each of the layers 28, 29, 30, 31, 32, 33, 34 and 35 (FIG. 8) being conditionally shifted in a radial direction with respect to the segments of the layers 27, 28, 29, 30, 31, 32, 33 and 34, respectively, adjacent thereto.

Referring to FIG. 7, there is shown an arrangement of fifteen slots $3_1$ through $3_7$ and $3_{34}$ through $3_{40}$ intended for the installation of the poles $2_1$ through $2_7$ (FIG. 1) and $2_{34}$ through $2_{40}$, respectively. The arrangement of the slots $3_1$ through $3_7$ and $3_{34}$ through $3_{40}$ in FIG. 8 is shown with dash-and-dot lines.

One of the segments 5 of the extreme layer 27 of the rim 1 is arranged so that its recesses 14 and 15 are found to be in the places of location of the slots $3_{40}$ and $3_1$, respectively, the recesses 13 and 16 of this segment coinciding with the places of location of the slots $3_{39}$ and $3_2$, respectively (FIG. 8). The segments 4 of the layer 27, adjacent to the segment 5, are arranged so that the extreme recess 9 of the right-hand segment 4 coincides with the place of location of the slot $3_3$, whereas the extreme recess 12 of the left-hand segment 4 coincides with the place of location of the slot $3_{38}$. In this case the remaining recesses 10, 11 and 12 of the right-hand segment 4 and the remaining recesses 9, 10 and 11 of the left-hand segment 4 will coincide with the places of location of the slots $3_4$, $3_5$ and $3_6$ and $3_{35}$, $3_{36}$ and $3_{37}$, respectively. The rest of the segments 4 of the layer 27 are mounted so that their recesses coincide with the places of location of the slots $3_7$ through $3_{18}$ (FIG. 1) and $3_{23}$ through $3_{34}$. The second segment 5 of the extreme layer 27 of the rim 1 is mounted so that its middle recesses coincide with the places of location of the slots $3_{20}$ and $3_{21}$, and the extreme recesses coincide with the places of location of the slots $3_{19}$ and $3_{22}$. Since the distance from the edges of each of the segments 4 and 5 to their respective extreme recesses 9 and 12 and 13 and 16 is somewhat less than $\tau_1/2$, gaps appear at the joints of the segments of the extreme layer 27 of the rim 1, these gaps being arranged between the places of location of the slots $3_{34}$ and $3_{35}$, $3_{38}$ and $3_{39}$, $3_2$ and $3_3$, $3_6$ and $3_7$, $3_{10}$ and $3_{11}$, $3_{14}$ and $3_{15}$, $3_{18}$ and $3_{19}$, $3_{22}$ and $3_{23}$, $3_{26}$ and $3_{27}$, and $3_{30}$ and $3_{31}$.

Consider now the installation of the segments in other layers of the rim 1 where the joints between the segments of the layers 28, 29, 30, 31, 32, 33, 34 and 34 are shifted with respect to the joints between the segments of the layers 27, 28, 29, 30, 31, 32, 33 and 34, respectively, a distance $\tau_1/2$, which is equal to one half the pole pitch within a group in a clockwise direction when viewed from the layer 27.

To provide said shift of the joints between the segments forming the next layer 28 of the rim 1 with respect to the joints between the segments of the layer 27 adjacent thereto, the segments of the layer 28 must be mounted so that the gaps at their joints are coincident with the places of location of the slots $3_{35}$, $3_{39}$, $3_3$, $3_7$, $3_{11}$, $3_{15}$, $3_{19}$, $3_{23}$, $3_{27}$ and $3_{31}$. To this end, behind the segments 4 of the layer 27, the segments 7 are mounted in the layer 28, and arranged so that their recesses 21, 22 and 23 are opposite the recesses 10, 11 and 12 of respective segments 4 of the layer 27 and coincide with the places of location of the respective slots. Since the distances between the extreme recesses 23 and 21 of the adjacent segments 7 of the layer 28 will be equal to $2\tau_1$ and the distances from the edges of each of the segments 7 to its extreme recesses 21 and 23 are somewhat less than $\tau_1$, gaps appear between the segments 7 of the layer 28, which gaps being located opposite to the recesses 9 of the segments 4 of the layer 27. Two of these recesses coincide with the places of location of the slots $3_{35}$ and $3_7$ and the other recesses (not shown) coicide with the places of location of the slots $3_{11}$, $3_{15}$, $3_{27}$ and $3_{31}$. Since in the layer 28 (FIGS. 7 and 8), between the places of location of the adjacent slots $3_{40}$ and $3_1$ of different groups, there are no joints between the segments, a segment is mounted in this layer, in which segment the distances between the adjacent recesses are unequal, namely the segment 8 (FIG. 8) is arranged so that its recesses 24 and 25 coincide with the places of location of the slots $3_{40}$ and $3_1$, respectively, its recess 26 coinciding with the place of location of the slot $3_2$. Since the distances from the edges of the segment 8 to its extreme recesses 24 and 26 being somewhat less than $\tau_1$, gaps appear between said segment 8 of the layer 28 and the segments 7 adjacent thereto, which gaps coincide with the places of location of the slots $3_{39}$ and $3_3$. In a like manner, still another segment 8 (not shown in FIGS. 1, 7 and 8) is mounted in the layer 28, arranged so that its recesses 24 and 25 coincide with the places of location of the slots $3_{20}$ (FIG. 1) and $3_{21}$, its recess 26 (FIG. 6) coinciding with the place of location of the slot $3_{22}$ (FIG. 1) while the gaps (not shown) between its edges and the edges of the segments adjacent thereto coincide with the places of location of the slots $3_{19}$ and $3_{23}$.

To provide the shift of the joints between the segments of the next layer 29 (FIGS. 7 and 8) with respect to the joints between the segments of the layer 28 adjacent thereto, the segments of the layer 29 should be mounted so that the gaps at their joints are shifted with respect to the gaps at the joints of the segments of the layer 27 by the pole pitch in a clockwise direction and positioned between the places of location of the slots $3_{35}$ and $3_{36}$, $3_{39}$ and $3_{40}$, $3_3$ and $3_4$, $3_7$ and $3_8$, $3_{11}$ and $3_{12}$, $3_{15}$ and $3_{16}$, $3_{19}$ and $3_{20}$, $3_{23}$ and $3_{24}$, $3_{27}$ and $3_{28}$, $3_{31}$ and $3_{32}$. To this end, behind the segments 7 (FIG. 8) of the layer 28, the segments 4 are mounted in the layer 29, their location corresponding to the location of the segments 4 of the layer 27 if they had been shifted by the pole pitch in a clockwise direction. In this case, the recesses of the segments 4 of the layer 29 will coincide with the places of location of the slots $3_{34}$ through $3_{39}$, $3_4$ through $3_{19}$ and also of the slots $3_{24}$ through $3_{33}$. One of the gaps between the segments 4 (FIG. 8) of the layer 29 will be found between the places of location of the slots $3_{35}$ and $3_{36}$, and the remaining gaps (not shown) between these segments will be found between the places of location of the slots $3_{11}$ and $3_{12}$, $3_{15}$ and $3_{16}$, $3_{27}$ and $3_{28}$, and $3_{31}$ and $3_{32}$. Since there are no joints between the segments in the layer 29 (FIGS. 7 and 8) between the places of location of the adjacent slots $3_{40}$ and $3_1$ of different groups, a is also mounted in this layer, in which segment the distances between the adjacent recesses are unequal, namely the segment 6 (FIG. 8) is arranged so that its recesses 17 and 18 coincide with the places of location of the slots $3_{40}$ and $3_1$, respectively, its recesses 19 and 20 coinciding with the places of location of the slots $3_2$ and $3_3$, respectively. Since the distances from the edges of the segment 6 to its extreme recesses 17 and 20 are somewhat less than $\tau_1$, gaps appear between said segment 6 of the layer 29 and the segments 4 adjacent thereto, which gaps are found between the places of location of the slots $3_{39}$ and $3_{40}$ and also between the places of location of the slots $3_3$ and $3_4$. In a like manner, still another segment 6 (not shown in FIGS. 1,7 and 8) is mounted in the layer 29 and arranged so that its recesses 17 and 18 coincide with the places of location of the slots $3_{20}$ and $3_{21}$, respectively, its recesses 19 (FIG. 6) and 20 coinciding with the places of location of the slots $3_{22}$ (FIG. 1) and $3_{23}$, respectively. The gaps (not shown) between its edges and the edges of adjacent segments are found between the places of location of the slots $3_{19}$ and $3_{20}$ and also between the places of location of the slots $3_{23}$ and $3_{24}$.

To provide the shift of the joints between the segments of the next layer 30 (FIGS. 7 and 8) with respect to the joints between the segments of the layer 29 adjacent thereto, the segments of the layer 30 should be mounted so that the gaps at their joints are shifted with respect to the gaps of the joints of the segments of the layer 28 by the pole pitch in a clockwise direction and coincident with the places of location of the slots $3_{36}$, $3_{40}$, $3_4$, $3_8$, $3_{12}$, $3_{16}$, $3_{20}$, $3_{24}$, $3_{28}$ and $3_{32}$. To do this, behind the segments 4 (FIG. 8) of the layer 29 the segments 7 are mounted in the layer 30, their arrangement conforming to the arrangement of the segments 7 of the layer 28, if they had been shifted by the pole pitch in a clockwise direction. In this event, the recesses of the segments 7 of the layer 30, mounted behind the segments 4 of the layer 29, coincide with the places of location of the slots $3_{34}$, $3_{35}$, $3_{37}$ through $3_{39}$, $3_5$ through $3_7$, slots $3_9$ through $3_{11}$, $3_{13}$ through $3_{15}$, $3_{17}$ through $3_{19}$, $3_{25}$ through $3_{27}$, $3_{29}$ through $3_{31}$ and $3_{33}$. One of the gaps between the segments 7 (FIG. 8) of the layer 30 coincides with the place of location of the slot $3_{36}$ and the remaining gaps (not shown) between these segments coincide with the places of location of the slots $3_8$, $3_{12}$, $3_{16}$, $3_{28}$, $3_{32}$. Since in the layer 30 (FIGS. 7 and 8) one of the gaps at the joint between the segments must coincide with the place of location of one of the slots of one of the pairs of the adjacent slots of different groups, namely with the place of location of the slot $3_{40}$, while another gap at the joint between the segments must coincide with the place of location of one of the slots of the other pair of the adjacent slots of different groups, namely, with the place of location of the slot $3_{20}$ (FIG. 1), two more segments 7 are mounted in the layer 30 (FIG. 8). One of these segments is positioned so that its recesses 21, 22 and 23 coincide with the places of location of the slots $3_1$, $3_2$ and $3_3$, respectively, of the same group, and the gaps between said segment and the adjacent segments coincide with the places of location of the slots $3_{40}$ and $3_4$, the other segment (not shown in FIGS. 1,7 and 8) is similarly positioned so that its recesses coincide with the places of location of the slots $3_{21}$, $3_{22}$, and $3_{23}$ and the gaps (not shown) between this segment and the adjacent segments coincide with the places of location of the slots $3_{20}$ and $3_{24}$. In this event, the gap at the joint between the segments of the layer 30 (FIGS. 7 and 8) coincident with the place of location of the slot $3_{40}$, as well as the gap (not shown) coincident with the place of location of the slot $3_{20}$ (FIG. 1) somewhat exceed the gaps at the remaining joints between the segments of the layer 30 (FIGS. 7 and 8), namely by a value equal to $\tau_2 - \tau_1$.

To provide the shift of the joints between the segments of the next layer 31 with respect to the joints between the segments of the layer 30 adjacent thereto, the segments of the layer 31 should be mounted so that the gaps at their joints are shifted with respect to the gaps at the joints of the segments of the layer 29 by the pole pitch in a clockwise direction and are located between the places of location of the slots $3_{36}$ and $3_{37}$, $3_{40}$ and $3_1$, $3_4$ and $3_5$, $3_8$ and $3_9$, $3_{12}$ and $3_{13}$, $3_{16}$ and $3_{17}$, $3_{20}$ and $3_{21}$, $3_{24}$ and $3_{25}$, $3_{28}$ and $3_{29}$, $3_{32}$ and $3_{33}$. To this end, behind the segments 7 of the layer 30, the segments 4 are mounted in the layer 31, their arrangement conforming to the arrangement of the segments 4 of the layer 29, if they had been shifted by the pole pitch in a clockwise direction. In this event, the recesses of the segments 4 of the layer 31, mounted behind the segments 7 of the layer 30, coincide with the places of location of the slots $3_{34}$ through $3_{40}$ and $3_5$ through $3_{20}$ and also of the slots $3_{25}$ through $3_{33}$, the gaps between the segments 4 (FIG. 8) of the layer 31 being found between the places of location of the slots $3_{36}$ and $3_{37}$, $3_{12}$ and $3_{13}$, $3_{16}$ and $3_{17}$, $3_{28}$ and $3_{29}$, $3_{32}$ and $3_{33}$. Since there are joints between the segments in the layer 31 (FIGS. 7 and 8) between the places of location of the adjacent slots of different groups, namely between the places of location of the slots $3_{40}$ and $3_1$ and between the places of location of the slots $3_{20}$ and $3_{21}$, two more segments 4 are mounted in the layer 31 (FIG. 8). One of these segments is positioned so that its recesses 9, 10, 11 and 12 coincide, respectively, with the places of location of the slots $3_1$, $3_2$, $3_3$ and $3_4$ of the same group, and the gaps between this segment and the adjacent segments 4 are found to be between the places of location of the slots $3_{40}$ and $3_1$ and between the places of location of the slots $3_4$ and $3_5$. The other segment (not shown in FIGS. 1, 7 and 8) is similarly positioned so that its recesses coincide with the places of location of the slots of the same group $3_{21}$, $3_{22}$, $3_{23}$ and $3_{24}$ and the gaps (not shown) between this segment and the adjacent segments are found to be between the places of location of the slots $3_{20}$ and $3_{21}$ and between the places of location of the slots $3_{24}$ and $3_{25}$. In this event, the gap at the joints between the segments of the layer 31 (FIGS. 7 and 8), positioned between the places of location of the slots $3_{40}$ and $3_1$ as well as the gap (not shown) positioned between the places of location of the slots $3_{20}$ (FIG. 1) and $3_{21}$, somewhat exceeds the gaps at the remaining joints between the segments of the layer 31 (FIGS. 7 and 8), namely by a value equal to $\tau_2 - \tau_1$.

To provide the shift of the joints between the segments of the next layer 32 with respect to the joints between the segments of the layer 31 adjacent thereto, the segments of the layer 32 should be mounted so that the gaps at their joints are coincident with the places of location of the slots $3_{37}$, $3_1$ $3_5$, $3_9$, $3_{13}$, $3_{17}$, $3_{21}$, $3_{25}$, $3_{29}$ and $3_{33}$. Thus, in the layer 32 (FIGS. 7 and 8), one of the gaps at the joints between the segments should coincide with the place of location of one of the slots of one of the pairs of the adjacent slots of different groups, namely with the place of location of the slot $3_1$, while another gap should coincide with the place of location of one of the slots of the other pair of the adjacent slots of different groups, namely with the place of location of the slot $3_{21}$ (FIG. 1). To this end, ten segments 7 are mounted in the layer 32 (FIG. 8), their arrangement confirming to the arrangement of the segments 7 of the layer 30, if they had been shifted by the pole pitch in a clockwise direction. As a result, the recesses 21, 22 and 23 of each of the segments 7 of the layer 32 coincide with the places of location of three slots of the same group arranged in series namely the slots $3_{34}$ through $3_{36}$, $3_{38}$ through $3_{40}$, $3_2$ through $3_4$, $3_6$ through $3_8$, $3_{10}$ through $3_{12}$, $3_{14}$ through $3_{16}$, $3_{18}$ through $3_{20}$, $3_{22}$ through $3_{24}$, $3_{26}$ through $3_{28}$, and $3_{30}$ through $3_{32}$. In this event, a part of the gaps between the segments 7 (FIG. 8) of the layer 32 coincide with the places of location of the slots $3_{37}$, $3_1$, $3_5$, $3_9$, $3_{13}$, $3_{17}$, $3_{21}$, $3_{25}$, $3_{29}$ and $3_{33}$. The gap at the joint between the segments of the layer 32 (FIGS. 7 and 8), coincident with the place of location of the slot $3_1$ as well as the gap (not shown) coincident with the place of location of the slot $3_{21}$ (FIG. 1), somewhat exceeds the gaps at the remaining joints between the segments of the layer 32 (FIGS. 7 and 8), namely by a value equal to $\tau_2 - \tau_1$.

To provide the shift of the joints between the segments of the layer 33 with respect to the joints of the layer 32, the segments of the layer 33 should be mounted so that the gaps at their joints are located between the places of location of the slots $3_{37}$ and $3_{38}$, $3_1$ and $3_2$, $3_5$ and $3_6$, $3_9$ and $3_{10}$, $3_{13}$ and $3_{14}$, $3_{17}$ and $3_{18}$, $3_{21}$ and $3_{22}$, $3_{25}$ and $3_{26}$, $3_{29}$ and $3_{30}$, and $3_{33}$ and $3_{34}$. To this end, the segments 4 are mounted in the layer 32, their arrangement conforming to the arrangement of the segments 4 in the layer 29 if they had been shifted by two pole pitches in a counter-clockwise direction. In this event, the recesses of the segments 4 of the layer 33 coincide with the places of location of the slots $3_{34}$ through $3_{37}$, $3_2$ through $3_7$, $3_8$ through $3_{17}$ and $3_{22}$ through $3_{33}$, one of the gaps between the segments 4 (FIG. 8) of the layer 33 are located between the places of location of the slots $3_5$ and $3_6$, $3_9$ and $3_{10}$, $3_{13}$ and $3_{14}$, $3_{25}$ and $3_{26}$, $3_{29}$ and $3_{30}$, $3_{33}$ and $3_{34}$. Since there are no joints between the segments in the layer 33 (FIGS. 7 and 8) between the places of location of the adjacent slots $3_{40}$ and $3_1$ of different groups, a segment is also mounted in this layer, in which segment the distances between the adjacent recesses are unequal, namely the segment 6 (FIG. 8) positioned so that its recesses 17, 18, 19 and 20 coincide, respectively, with the places of location of the slots $3_1$, $3_{40}$, $3_{39}$ and $3_{38}$, i.e. so that it is inversed with respect to the segments 6 in the layer 29. The gaps between the edges of said segment 6 of the layer 33 and the edges of the segments 4 adjacent thereto, are found to be between the places of location of the slots $3_{37}$ and $3_{38}$ and also $3_1$ and $3_2$. In a like manner, still another segment 6 (not shown in FIGS. 1, 7 and 8) is mounted in the layer 33, and arranged so that its recesses 17, 18, 19 and 20 coincide, respectively, with the places of location of the slots $3_{21}$ (FIG. 1), $3_{20}$, $3_{19}$, $3_{18}$, i.e. so that it is also reversed with respect to the segments 6 (one of them is shown in FIG. 8) in the layer 29, the gaps (not shown) between its edges and the edges of the adjacent segments are found to be between the places of location of the slots $3_{17}$ and $3_{18}$ and the places of location of the slots $3_{21}$ and $3_{22}$.

To provide the shift of the joints between the segments of the next layer 34 (FIGS. 7 and 8) with respect to the joints between the segments of the layer 33, the segments of the layer 34 must be positioned so that the gaps on their joints are coincident with the places of location of the slots $3_{34}$, $3_{38}$, $3_2$, $3_6$, $3_{10}$, $3_{14}$, $3_{18}$, $3_{22}$, $3_{26}$ and $3_{30}$. To this end, the segments 7 are mounted in the layer 34 (FIG. 8), their arrangement conforming to the arrangement of the segments 7 in the layer 30 if they had been shifted by two pole pitches in a counter-clockwise direction. In this event, the recesses of the segments 7 of the layer 34 will coincide with the places of location of the slots $3_{35}$ through $3_{37}$, $3_3$ through $3_5$ and $3_7$ through $3_9$, $3_{11}$ through $3_{13}$, $3_{15}$ through $3_{17}$, $3_{23}$ through $3_{25}$, $3_{27}$ through $3_{29}$ and $3_{31}$ through $3_{33}$. The gaps between the segments 7 (FIG. 8) of the layer 34 will be found in the places of location of the slots $3_{34}$, $3_6$, $3_{10}$, $3_{14}$, $3_{26}$ and $3_{30}$. Since there are no joints between the segments in the layer 34 (FIGS. 7 and 8) between the places of location of the adjacent slots $3_{40}$ and $3_1$ of different groups, a segment is also mounted in this layer, the distances between the adjacent recesses thereof being unequal, namely the segment 8 (FIG. 8) positioned so that its recesses 24, 25 and 26 coincide, respectively, with the places of location of the slots $3_1$, $3_{40}$ and $3_{39}$, i.e. so that it is reversed with respect to the segments 8 in the layer 30, the gaps between the edges of said segment 8 of the layer 34 and the edges of the segments 7 adjacent thereto coinciding with the places of location of the slots $3_{38}$ and $3_2$. In a similar way, still another segment 8 (not shown in FIGS. 1, 7 and 8) is mounted in the layer 34, and positioned so that its recesses 24, 25 and 26 coincide, respectively, with the places of location of the slots $3_{21}$ (FIG. 1), $3_{20}$ and $3_{19}$, i.e. so that it is reversed with respect to the segments 8 (one of them is shown in FIG. 8) in the layer 29, the gaps (not shown) between its edges and the edges of adjacent segments coinciding with the places of location of the slots $3_{18}$ and $3_{22}$.

To provide the shift of the joints between the segments of the next layer 35 (FIGS. 7 and 8) with respect to the joints between the segments of the layer 34, the segments of the layer 35 should be arranged so that the gaps at their joints are located between the places of location of the slots $3_{34}$ and $3_{35}$, $3_{38}$ and $3_{39}$, $3_2$ and $3_3$, $3_6$ and $3_7$, $3_{10}$ and $3_{11}$, $3_{14}$ and $3_{16}$, $3_{18}$ and $3_{19}$, $3_{22}$ and $3_{23}$, $3_{26}$ and $3_{27}$, and $3_{30}$ and $3_{31}$, i.e. in exactly the same manner as the gaps at the joints between the segments of the layer 27 (FIGS. 7 and 8). Because of this, the arrangement of the segments in the layer 35 coincide completely with the arrangement of the segments in the layer 27. The arrangement of the segments in the layer (not shown in the drawing) next to the layer 35 (FIGS. 7 and 8) coincide with the arrangement of the segments in the layer 28 etc., i.e. the same arrangement of the segments in the rim 1 (FIG. 1) of the rotor will appear every seven layers.

Thus, upon the installation of the segments in the layers of the rim 1, hereinbefore described, there is provided a distribution of the slots $3_1$ through $3_{40}$ formed by the recesses in the segments of which the rim 1 is built, over the rim circumference, such as to form groups, adjacent slots in each group being equispaced by a distance equal to $\tau_1$, while maintaining equal distances between adjacent slots of different groups, amounting to $\tau_2$ and exceeding the distance $\tau_1$ by which the slots within a group are spaced. Upon the installation of like poles in these slots, each pole being symmetrical with respect to its magnetic axis, the distribution of the magnetic axes of the poles over the circumference of the rim 1 appears to be the same as the distribution of the slots, which enables, with an appropriate choice of the distances $\tau_1$ and $\tau_2$, suppression of the tooth harmonics in the emf curve of a synchronous salient-pole electrical machine having a laminated rotor rim, without recourse to the installation of non-like poles on the rotor.

The number of types of the segments having a length of about four pole pitches and used to build up the rotor rim in the manner hereinbefore described, with the shift of the joints between the segments of each layer by half the pole pitch with respect to the joints between the segments of an adjacent layer, is equal to five as compared with two types of the segments that might be necessary with a rim built up with an uniform distribution of the slots over the circumference. Namely, besides the segments 4 (FIG. 2) and 7 (FIG. 5) in which the slots are spaced from each other by the same distances equal to $\tau_1$, it is necessary to use the additional segments 5 (FIG. 3), 6 (FIG. 4) and 8 (FIG. 6) wherein two adjacent slots are spaced from each other by a distance equal to $\tau_2$ and different than the distance $\tau_1$.

The number of additional types of segments required to build up the rotor rim decreases if, with the same length of the segments, the shift of the joints between the segments of the adjacent layer is one pole pitch. For instance, with an arrangement of the segments in the last layer of the rim conforming to their arrangement in the layer 27 (FIGS. 7 and 8), the arrangement of the segments in next layers of the rim will copy in succession the arrangement of the segments in the layers 29, 31, 33, 27, etc., respectively. In this case, segments of three types are to be used to build the rim up, namely the segments 4 (FIG. 2), the segments 5 (FIG. 3) and the segments 6 (FIG. 4), i.e. the number of types of the segments increases by two as compared to a laminated rim with evenly distributed slots, requiring, only segments 4 (FIG. 2) to build it up. If the arrangement of the segments in the last layer of the rim conforms to the arrangement of the segments in the layer 28 (FIGS. 7 and 8), the arrangement of the segments in the next layers of the rim will copy in succession the arrangement of the segments in the layers 30, 32, 34, 30 etc., respectively. In this event, segments of two types will be used too build up the rim, namely the segments 7 (FIG. 5) and the segments 8 (FIG. 6), i.e. the number of types of the segments will be increased by one as compared to a laminated rim with an uniform distribution of the slots.

It can easily be shown that with use of shorter segments to build up the rotor, the number of the additional segments tends to decrease. Thus, with the segments whose length makes up about three pole pitches, two additional segments (four instead of two) will be required on shifting the joints between the segments of adjacent layers by half the pole pitch, and one additional segment (two instead of one) will be required on shifting the joints between the segments of the adjacent layers by one pole pitch.

It is also possible to gain the suppression of the tooth harmonics when the distance between the adjacent poles of different groups is less than the distance between the adjacent poles within a group. In this case, too, the present invention provides the possibility for suppression of the tooth harmonics when using alike poles installed on a rotor with a laminated rim.

Figure 9:
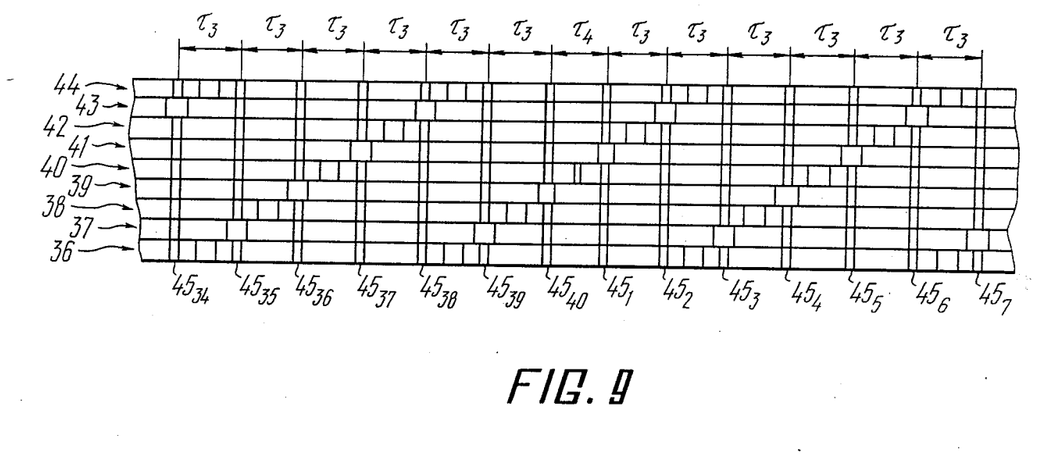
FIG. 9 illustrates the distribution of the slots over the rotor rim circumference, when the distribution of the poles is such that the distances between the adjacent poles of different groups are less than the distances between adjacent poles within a group.
Figure 10:
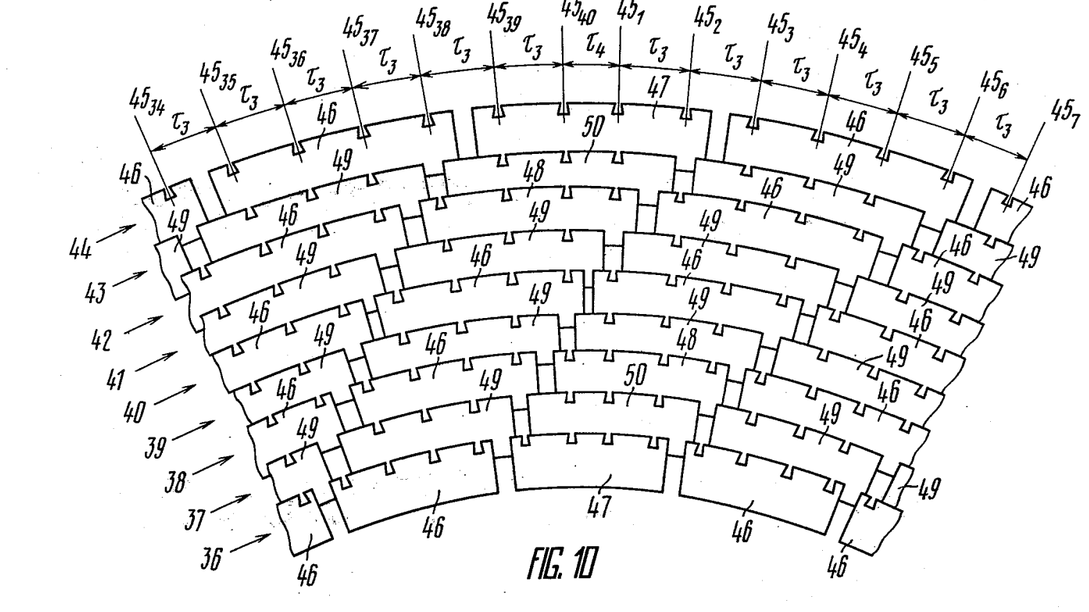
FIG. 10 is a view showing the building up of the rotor rim with the distribution of the slots over the rim circumference being as shown in FIG. 9.

The installation of the segments in the layers of a rotor rim, in such a case, is illustrated in FIG. 9 showing a part of the outer surface of eight successive layers 36, 37, 38, 39, 40, 41, 42, 43 and 44 of the rim, rotated conditionally in the drawing plane, and in FIG. 10 showing an end view of the rim part corresponding to the part of the outer surface of the rim layers, shown in FIG. 9, the segments of each of the layers 36 through 44 being conditionally shifted in a radial direction in a manner like the segments shown in FIG. 8.

The distribution of the slots over the rim circumference in this case also coincide with the distribution of the poles. Referring to FIG. 9, there is shown an arrangement of the slots $45_{34}$ through $45_{40}$ and $45_1$ through $45_7$ wherein poles (not shown) are mounted. The slots $45_{34}$ through $45_{40}$ belong to one of the groups and are equispaced from each other by a distance $\tau_3$, the slots $45_1$ through $45_7$ belong to another group and are equispaced from each other also by the distance $\tau_3$. The distance between the adjacent slots $45_{40}$ and $45_1$ of different groups is equal to $\tau_4$ which is less than $\tau_3$. The arrangement of the slots $45_{34}$ through $45_{40}$ and $45_1$ through $45_7$ is shown in FIG. 10 in dash-and-dot lines. As in the above described case, the rim is built up in the segments having a length making up about four pole pitches by shifting the joints between the segments of the adjacent layers by half the pole pitch within a group, i.e. by a value equal to $\tau_3/2$.

The arrangement of the segments in the layers 36 through 44 (FIGS. 9 and 10) with respect to the slots of the rotor rim is similar to the arrangement of the segments in the layers 27 through 35 (FIGS. 7 and 8). The segments themselves are shaped like the segments 4, 5, 6, 7 and 8 mounted in the layers 27 through 35, but have their distinctive distances between the recesses corresponding to the values $\tau_3$ and $\tau_4$. Thus, instead of the segments 4 (FIG. 8), 5, 6, 7 and 8 mounted in the layers 27 through 35, the segments 46, 47, 48, 49 and 50, respectively, are mounted in the layers 36 through 44 (FIG. 10), these segments having the same number of recesses as the respective segments 4 through 8 (FIG. 8) and are arranged in the same manner i.e. so that the recesses of the segments 46 through 50 (FIG. 10) are positioned with respect to the slots of the rotor rim in a manner similar to the respective recesses of the segments 4 through 8 (FIG. 8). The distance between those adjacent recesses of the segments 46 through 50 (FIG. 10), which correspond to the adjacent recesses of the segments 4 through 8 (FIG. 8) spaced by the distance $\tau_1$, is equal to $\tau_3$, and the distance between those adjacent recesses of the segments 46 through 50 (FIG. 10), which correspond to the recesses of the segments 4 through 8 (FIG. 8) spaced by the distance $\tau_2$, is equal to $\tau_4$. In the segments 46 and 47, the distances from the edges of the segments to their extreme recesses should be somewhat less than $\tau_4/2$, and those in the segment 49 should be somewhat less than $\tau_4$, otherwise the edges of the segments 46 of the layer 40 will superimpose each other at the joint located between the places of location of the slots $45_{40}$ and $45_1$ of different groups while the gaps between the segments 49 of the layers 39 and 41 at the joints in the places of location, respectively, of the slots $45_{40}$ and $45_1$ of different groups will be rather small. The distances from the edges of the segments 48 and 49 to their extreme recesses can be more than those in the segments 46, 47 and 50 but less than $\tau_3/2$ and $\tau_3$, respectively. As a result, in distinction to the previous case, it is not those joints between the segments which either coincide with the places of location of the adjacent slots of different groups or are interposed between them. Quite the contrary, on all remaining joints between the segments the gaps will be found to be increased when the distance between the magnetic axes of the adjacent poles of different groups is less than the distance between the magnetic axes of the adjacent poles within a group. The number of types of the segments required to build up the rim in the case when the distance between the magnetic axes of the adjacent poles of different groups is less than the distance between the magnetic axes of the adjacent poles within a group is determined in the same manner as in the case when the distance between the magnetic axes of the adjacent poles of different groups is more than the distance between the magnetic axes of the adjacent poles within a group, since, in both cases, the arrangement of the segments with respect to the slots is the same.

The assembly of the proposed rotor rim is accomplished in the same way as the assembly of conventional rotor rims and differs only in the scheme of the arrangement of the segments in the layers of the rim, in accordance with which the installation of the segments is carried out. Below is briefly given one possible way of doing this.

When building up the rim of a rotor whose shaft is generally vertical, successive placing of the segments is carried out beginning with the lower one. The segments of the lower layer are therewith rested upon tailor-made beads formed over the circumference of the rotor frame and upon auxiliary posts arranged over the frame circumference, these posts being removed upon the completion of the building up. The placing of the segments is carried out in accordance with the scheme of their arrangement allowing the installation of additional type segments in those layers of the rim wherein there are no joints between the segments between the places of location of the slots intended for receiving the adjacent poles of different groups, as hereinbefore described in detail. The installation of the segments at appropriate positions is achieved by matching the recesses provided along the inner edges of the segments, i.e. the edges faced the rotor shaft and opposite to the edges having the recesses for the installation of the poles, with the longitudinal recesses provided over the rotor frame circumference. Said matching of the slots and the recesses is accomplished by wedges inserted into the slots of the frame with their portions projecting out of the slots and entering into the recesses on the inner edges of the segments. Precision clamping of the position of the segments of different layers with respect to each other is accomplished by means of gauged round rods passing through some of the openings in the body of the segments. Reaming of the remaining openings of the segments and the shaping of the rim by means of pins inserted into these openings is then carried out, and, subsequently, the wedges are removed from the slots of the frame and the reaming of the slots formed in the rim by the recesses of both edges of the segments is carried out. Definitive clamping down of the rim on the rotor frame is accomplished by driving of wedge pairs consisting of oppositely directed wedges into the slots of the frame and rim matched with each other.

The present invention provides suppression of the tooth harmonics in the emf curve of a synchronous salient-pole electrical machine comprising a rotor with a rim built up in segments at rather minor complication of the production of parts of the rotor, its assembly and repair. Thus, in the case of an electrical machine, wherein, in order to suppress the tooth harmonics, the poles of the rotor form groups of 20 poles each, it should be necessary, when using the rotor with a laminated rim, adjacent slots of which are spaced from each other by the same distances, to have ten various types of the poles and eleven various types of interpolar connections to produce the rotor, and also one or two types of the segments to build up the rim (when the shift of the joints between the segments of the adjacent layers makes up, respectively, one pole pitch or half the pitch). At the same time, in this case, when using a rotor according to the present invention, a pole of a single type and interpolar connections of two types are sufficient to produce the rotor, and segments of five types when the shift of the joints between the segments of the adjacent layers makes up half the pole pitch, or alternatively segments of three and even two types when the shift of the joints between the segments of the adjacent layers makes up one pole pitch—when using segments having a length of about four pole pitches to build up the rim are sufficient. In consequence, it becomes possible to greatly reduce the number of dies required to produce the rotor parts, to simplify the assembly of the rotor and, especially, its repair, its complexity being unaffected by the number of the segment types used to build up the rim, and the disassembly of the rim not being necessary when repairing.

Although particular preferred embodiments of the invention have been disclosed above for illustrative purposes, it will be understood that modifications, which lie within the scope of appended claims, are fully contemplated.

We claim:

1. A rotor for a synchronous salient-pole electrical machine comprising:

a rim built up in annular layers consisting of segments provided with recesses and mounted at a shift of joints between the segments of each of the said layers with respect to the joints between the segments of an adjacent layer so that the recesses of the segments of the adjacent layers are found to be opposite to each other, thus forming slots on the circumference of said rim, said slots being located so as to form a plurality of groups distributed in series over the circumference of said rim and having the same number of slots, the distances between the adjacent slots within each of said groups being the same and equal to the distances between the adjacent slots in other groups, the distances between the adjacent slots of different groups being also the same and different than said distances between the adjacent slots within a group, said distances between the adjacent slots within a group and said distances between the adjacent slots of different groups being chosen such as to ensure suppression of the tooth harmonics in the emf curve of the machine, some of said segments being shaped so that, in each of them, adjacent recesses are spaced from each other by a distance equal to said distance between the adjacent slots within a group and arranged so that the recesses of each of them are found to be in the places of location of the slots of the same group, and the remaining segments are shaped so that, in each of them, two adjacent recesses are spaced from each other by a distance equal to said distance between the adjacent slots of different groups, and the rest of the adjacent recesses are spaced from each other by a distance equal to said distance between adjacent slots within a group and are arranged in those of said layers of said rim, wherein, between the places of location of adjacent slots of different groups, there are no joints between the segments so that their recesses located at a distance equal to said distances between adjacent slots of different groups are found to be in the places of location of the adjacent slots of different groups; and a plurality of like poles, whose number is equal to the number of said slots and each of said poles is arranged in a respective slot.

* * * * *